United States Patent [19]
Kubota et al.

[11] Patent Number: 5,553,140
[45] Date of Patent: Sep. 3, 1996

[54] DIGITAL AND ANALOG INTERFACE FOR SET BACK BOX

[75] Inventors: Yukio Kubota, Tokyo, Japan; Hajime Inoue, San Jose; Chuen-Chien Lee, Fremont, both of Calif.

[73] Assignees: Sony Corporation of Japan; Sony Electronics, Inc., both of Park Ridge, N.J.

[21] Appl. No.: 250,564

[22] Filed: May 26, 1994

[51] Int. Cl.$^6$ .............................. H04N 7/16; H04N 7/167
[52] U.S. Cl. .............................. 380/10; 348/426; 348/553; 348/554; 348/555; 348/572
[58] Field of Search .............................. 380/10; 348/40, 348/41, 42, 43, 44, 426, 432, 441, 488, 553, 554, 555, 572, 584, 727

[56] References Cited

U.S. PATENT DOCUMENTS

| | | | |
|---|---|---|---|
| 2,884,481 | 4/1959 | Schor | 348/727 X |
| 4,301,475 | 11/1981 | McCoy | 348/584 |
| 4,476,484 | 10/1984 | Haskell | 348/426 X |
| 4,502,078 | 2/1985 | Steckler et al. | 348/727 |
| 4,628,345 | 12/1986 | Geiger et al. | 348/488 X |
| 4,797,746 | 1/1989 | Ashcraft | 348/441 |
| 4,872,054 | 10/1989 | Gray et al. | 348/441 |
| 5,280,397 | 1/1994 | Rhodes | 348/441 X |
| 5,442,460 | 8/1995 | Rhodes | 348/441 |

*Primary Examiner*—Bernarr E. Gregory
*Attorney, Agent, or Firm*—Irell & Manella LLP

[57] ABSTRACT

A method and apparatus for interfacing digital and analog consumer electronic devices with digital and analog broadcast signals. The broadcast signals are received by electronic devices which tune the signals and provide them to set back boxes. The set back boxes process the signals and provide a plurality of signals to a plurality of electronic devices. Analog devices are provided with composite video signals, luminance video signals, chrominance video signals, and at least one audio signal while digital devices are provided with a digital video and audio signal. The processing performed by the set back boxes includes signal descrambling and decryption for analog and digital signals, error correction for digital signals, and intermediate frequency signal processing for analog signals. In addition, to interface digital signals, including high definition television (HDTV) signals, with analog electronic devices, the set back box decompresses the digital signal and converts it to an analog signal. A command line provides for communication between the set back box and the plurality of electronic devices.

45 Claims, 6 Drawing Sheets

DIGITAL AND ANALOG INTERFACE FOR SET BACK BOX

BACKGROUND OF THE INVENTION

1. Field of the Invention

The present invention relates to the field of interfaces for electronic devices. More particularly, the present invention relates to an electronic interface between a digital or analog broadcast signal and various combinations of digital and analog electronics devices.

2. Art Background

The simultaneous growth of the cable television industry and the proliferation of various kinds of consumer electronics devices has spawned a need for providing a standard electronic interface between the signal source and the electronic device. Consumer electronic devices contain various features (eg. pictures within pictures) that may not function properly in a cable television environment due to scrambling, encoding or encryption of the cable signal. The United States Congress has mandated that the Federal Communications Commission (FCC) promulgate rules to assure compatibility between televisions, video cassette recorders and cable systems. These rules must be consistent with the need to prevent theft of cable service while providing cable subscribers with the ability to enjoy the full benefit of both the programming available on cable systems, and the functions available on their televisions and video cassette recorders. (See, 47 U.S.C. §544a, Section 17 of the Cable Television Consumer Protection and Competition Act of 1992).

Thus, consumer electronics and cable television systems should support the use of advanced television features such as pictures within pictures ("PIP"), the option of watching one program while recording another, the ability to record sequential premium channels, and provide for cable security such as encryption devices to prevent the theft of cable signals.

The use of digital broadcasting media adds to the difficulty of devising an electronic interface that performs the above listed functions. Current systems generally support only analog transmissions, and the existing electronic interfaces are not equipped to support digital broadcasts, such as high definition television (HDTV) broadcasts. Further, to support the Congressional mandate, the existing analog consumer electronic devices must be configured to receive these digital broadcasts, and exist in an integrated system with digital consumer electronics products.

The FCC has responded to these challenges with a Decoder Interface Concept. This provides for a television or video cassette recorder to "tune" the channel, a "set back box" to receive the tuned signal, descramble it and provide it to a television, video cassette recorder or other device for display or recording. (See Volume 58, No. 234, page 64541 of the Federal Register, Wednesday, Dec. 6, 1993). The system must also support both digital and analog signals, and allow for communication between the consumer electronics device and the set back box.

The FCC's concept has not yet been implemented in a specific system that satisfies the Congressional goals and will work in an environment of digital broadcasts. As will be described, the present invention provides an interface that supports the Congressional requirements, as well as accommodates future developments of digital video cassette recorders, optical storage devices and digital televisions.

SUMMARY OF THE INVENTION

The present invention provides methods and apparatus for providing an electronic interface that supports the FCC requirements and will operate in an environment of digital broadcasts, including high definition television (HDTV) broadcast. A subscriber receives a digital or analog broadcast signal from a service provider and the present invention interfaces this broadcast signal with any combination of digital and analog electronic devices. The broadcast signal is received and tuned by one of the subscriber's electronic devices. The tuned signal is then provided to a "set back box." The set back boxes of the present invention process the tuned signal to make it available to a plurality of analog or digital consumer electronics devices.

The set back boxes split analog transmissions into separate video, audio and security signals. The security portion of the signal contains information regarding the subscriber's authorization to view the particular broadcast. For digital broadcasts, the set back boxes of the present invention demodulate a digital broadcast program signal to convert it into a bit stream. The bit stream is then corrected for any errors in the transmission of the digital data, and a separate security signal is again derived which contains information regarding the subscriber's authorization to view the particular broadcast. If the subscriber is authorized to view the particular broadcast, the set back box provides the bit stream directly to the subscriber's digital devices. Before being provided to analog devices, the bit stream is decompressed and converted to an analog signal. A set back box provides analog devices with composite video together with separate luminance and chrominance parts of the video signal, or component video. A command line is provided to allow communication between the subscriber's set back box and consumer electronics devices.

DETAILED DESCRIPTION OF THE INVENTION

An electronic interface between a digital or analog broadcast signal and various combinations of digital and analog consumer electronics devices is disclosed. In the following description, for purposes of explanation, details such as specific electronic devices are set forth in order to provide a thorough understanding of the present invention. However, it will be apparent to one skilled in the art that the present invention may be practiced without these specific details. In other instances, well-known circuits and structures are not described in detail in order not to obscure the present invention unnecessarily.

The following detailed description will be divided into several sections. The first of these will describe a general system arrangement for the interface of the present invention. Subsequent sections describe the different types of hardware that are needed for interfacing broadcasts with different types of electronic equipment.

GENERAL SYSTEM CONFIGURATION

Figures 1, 2:
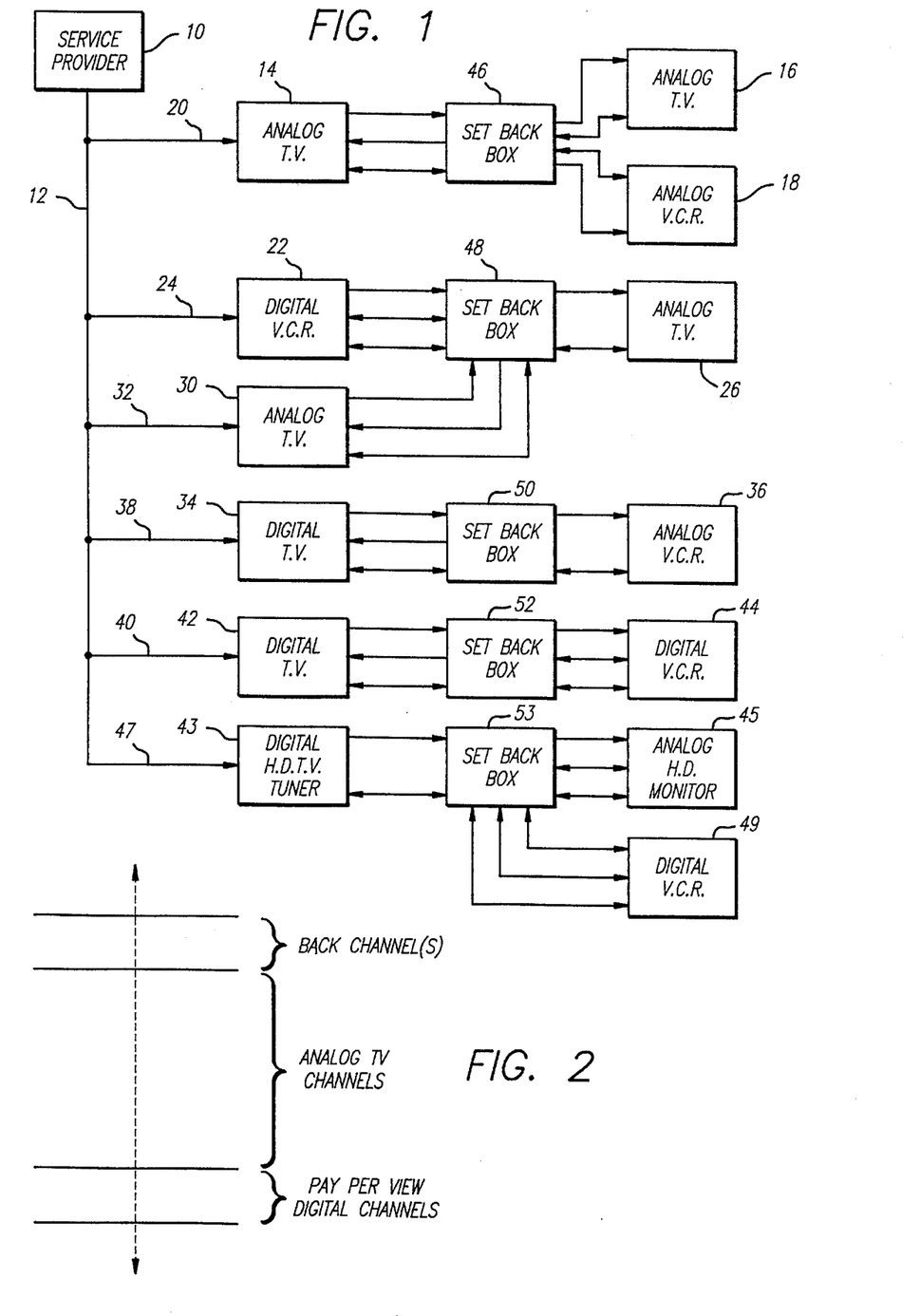
FIG. 1 is a functional block diagram of one embodiment of the present invention in the context of a cable based home entertainment system configured to receive broadcasts.
FIG. 2 diagrammatically illustrates one possible electronic spectrum utilized by the cable based system illustrated in FIG. 1.

The present invention provides an electronic interface between digital and analog broadcast signals and digital and analog consumer electronics devices. With reference to FIG. 1, an overview of a cable based home entertainment system for receiving broadcasts is shown. The cable system includes a service provider 10, providing analog or digital broadcast signals to subscribers over a transmission medium 12, which in the present embodiment may comprise, for example, a cable, fiber optic, microwave, terrestrial broadcast or a direct satellite broadcast medium. As illustrated in schematic form in FIG. 1, at each of the subscribers' locations there may exist various consumer electronic devices to receive the programming services provided by the service provider 10. For example, as shown in FIG. 1, analog televisions 14 and 16 and an analog video cassette recorder 18 may be interfaced to receive an analog broadcast signal over transmission medium 12. Alternatively, a digital video cassette recorder 22 may be coupled to receive a digital broadcast signal over transmission medium 12, and an analog television 26 may be interfaced to the digital broadcast signal, or to an analog broadcast signal coupled over a tap cable 32 to an analog television 30, as shown. A subscriber's system may also consist of a digital television 34 that receives a digital broadcast signal over transmission medium 12, and an analog video cassette recorder 36 that interfaces with the digital broadcast signal.

In another configuration, the subscriber's system may consist of a digital television 42 and a digital video cassette recorder 44 where both the television 42 and the video cassette recorder 44 interface with a digital broadcast received over transmission medium 12. Systems for receiving digital high definition television (HDTV) broadcasts over medium 12 may consist of a digital high definition (HDTV) signal tuner 43, an analog high definition monitor 45 and a digital video cassette recorder 49. It will be appreciated that the electronic devices shown in FIG. 1 are representative of many possible devices, including devices not shown in FIG. 1, and that many possible configurations of those devices are possible.

FIG. 2 illustrates a representative electronic spectrum of the signals that may be received by the electronics devices of FIG. 1 over the transmission medium 12. The highest frequency of this spectrum consists of relatively low bandwidth back channels, which allow the subscriber to communicate to the service provider 10. Lower on the spectrum are analog television channels, pay per view digital channels and additional digital channels. It will be appreciated that the current invention may also operate with broadcast signals that have electronic spectrums different from that shown in FIG. 2.

Returning to FIG. 1, a broadcast program signal within a spectrum such as that shown in FIG. 2 is generated by the service provider 10. The broadcast signal is transmitted over the medium 12 and received by an electronic device, such as a television or videocassette recorder coupled to the medium 12 as shown and described. The electronics device receives a broadcast program signal that is compatible with the particular electronics device. For example, digital devices are coupled to the medium 12 for receiving digital signals, and analog devices are coupled to the medium 12 for receiving analog signals.

Analog televisions 14 and 30, digital video cassette recorder 22, and digital televisions 34, 42 and digital HDTV tuner 43 tune the signals and provide the tuned signals to set back boxes 46, 48, 50, 52 and 53, which process the signals to make them available for viewing, recording or other processing by the plurality of electronic devices, as will be described.

Thus, the set back boxes 46, 48, 50, 52 and 53 shown in FIG. 1 provide an interface between the plurality of electronic devices, analog televisions 14, 16, 26, and 30, analog high definition monitor 45, digital televisions 34 and 42, digital HDTV tuner 43, analog video cassette recorders 18 and 36, and digital video cassette recorders 22, 44 and 49, and the digital and analog broadcast signals over broadcast medium 12. If the subscriber is authorized to view a particular broadcast, then the subscriber's set back box will provide the subscriber's devices with a descrambled picture. Otherwise, the subscriber's set back box will provide a scrambled picture to the subscriber's devices. Security is thus maintained without impeding the subscriber's ability to use advanced television features, the subscriber's ability to watch one program while recording another, and the subscriber's ability to record sequential premium channels.

Different set back boxes are employed for different combinations of digital and analog broadcast signals and consumer electronics devices. The present invention includes four different types of set back boxes, which will be described separately in this Specification. As will be disclosed, an analog-to-analog set back box 46 interfaces analog broadcast signals received over medium 12 with the analog televisions 14 and 16 and the analog video cassette recorder 18. A digital, analog-to-digital and analog set back box 48 interfaces digital and analog broadcast signals received over medium 12 with the digital video cassette recorder 22, and the analog televisions 26 and 30. A digital-to-digital and analog set back box 50 interfaces a digital signal received over medium 12 with the digital television 34 and the analog video cassette recorder 36. A digital-to-digital set back box 52 interfaces a digital broadcast signal received over medium 12 with the digital television 42 and the digital video cassette recorder 44. A high definition television (HDTV) set back box 53 interfaces digital high definition television broadcasts over medium 12 with the analog high definition monitor 45, digital HDTV tuner 43 and the digital video cassette recorder 49.

Analog-to-Analog Set Back Box

Figure 3:
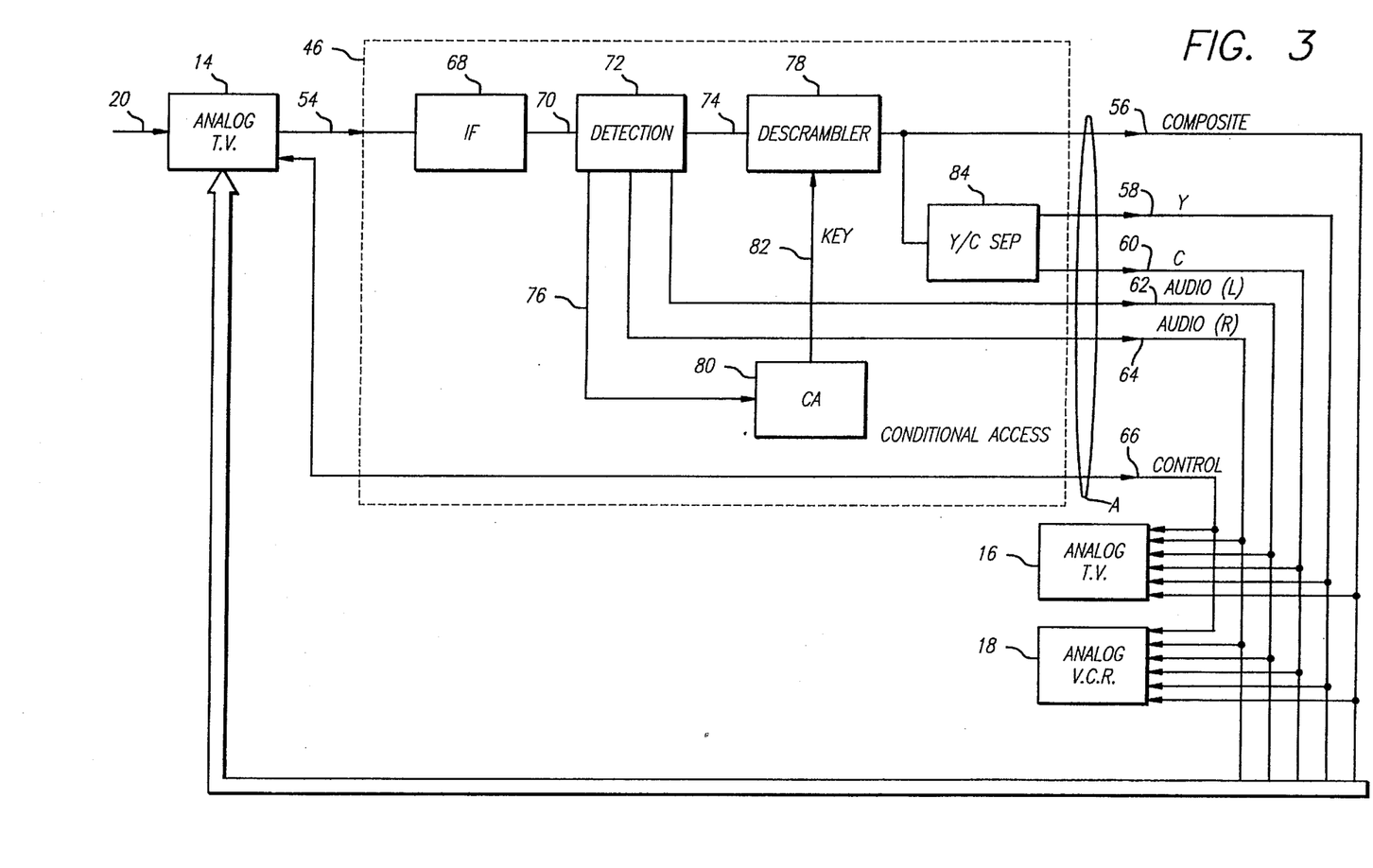
FIG. 3 illustrates a set back box utilizing the teachings of the present invention for interfacing analog signals with analog electronic devices.

Referring now to FIG. 3, the analog-to-analog set back box 46 interfaces analog signals received over medium 12 with the analog televisions 14 and 16 and the analog video cassette recorder 18. As shown, the analog television 14 receives an analog signal through medium 20 from the medium 12 (see FIG. 1), and provides an analog signal over line 54 to the analog-to-analog set back box 46. As will be described, the set back box 46 processes this analog broadcast signal and transforms it into a plurality of signals coupled to lines 56, 58, 60, 62 and 64 ready for viewing, recording or other processing by the analog televisions 14 and 16 and the analog video cassette recorder 18. The process of transforming the signal will be described below. The signals ready for viewing, recording or other processing over lines 56, 58, 60, 62 and 64 provided by the set back box 46 include a composite video signal on line 56, a luminance video signal on line 58, a chrominance video signal on line 60, and left and right audio signals on lines 62 and 64. A control line 66 couples the set back box 46 to the analog televisions 14 and 16 and the analog video cassette recorder 18, and allows the set back box 46 to communicate with the analog televisions 14 and 16 and the analog video cassette recorder 18.

As illustrated in FIG. 3, the broadcast signal received over medium 20 is received by the analog television 14. The analog television 14 tunes the received broadcast signal and converts the signal's frequency from a high frequency to an intermediate frequency (IF). The tuned IF signal is coupled over line 54 and is provided to the set back box 46.

The tuned IF signal coupled over line 54 is processed by an IF circuit 68 which receives the signal. The processed IF signal is coupled over line 70 to a detection circuit 72. The detection circuit 72 derives four signals from the received IF main signal: the possibly scrambled video composite portion of the IF signal which is then coupled over line 74; the left and right audio portions of the IF signal which the detection circuit couples to lines 62 and 64, and a security part of the IF signal which is coupled over line 76 and carries the security code for the received broadcast.

The possibly scrambled video composite portion of the signal coupled over line 74 is provided to a descrambler 78. The part of the signal carrying the security code for the broadcast coupled over line 76 is provided to a conditional access circuit 80. If the subscriber is entitled to view the particular broadcast, the conditional access circuit 80 provides an access signal over line 82 to the signal descrambler 78. This access signal provides the descrambler 78 with the key to descrambling the composite video portion of the broadcast signal provided over line 74.

The descrambled broadcast signal is coupled to line 56, and is provided to the analog televisions 14 and 16 and the analog video cassette recorder 18. A luminance/chrominance separation circuit 84 coupled to the descrambler circuit 78 splits the descrambled broadcast signal into its constituent parts: a luminance (Y) signal is coupled to line 58 and a chrominance (C) signal is provided over line 60. These signals over lines 58 and 60 are provided separately to the analog televisions 14 and 16 and the analog video cassette recorder 18, which are configured to receive separate luminance and chrominance signals.

The left and right audio portions of the broadcast signal over lines 62 and 64 are derived by the detector 72 and are provided to the analog televisions 14 and 16 and the analog video cassette recorder 18 with no further processing.

The analog televisions 14 and 16 and the analog video cassette recorder 18 are also coupled to the set back box 46 by an analog control line 66, over which a control signal passes. More specifically, the control line 66 allows a subscriber to issue commands to the set back box 46 and provides the analog televisions 14 and 16 and the analog video cassette recorder 18 with pertinent information.

Combined Digital Analog-to-Digital and Analog Set Back Box

Figure 4:
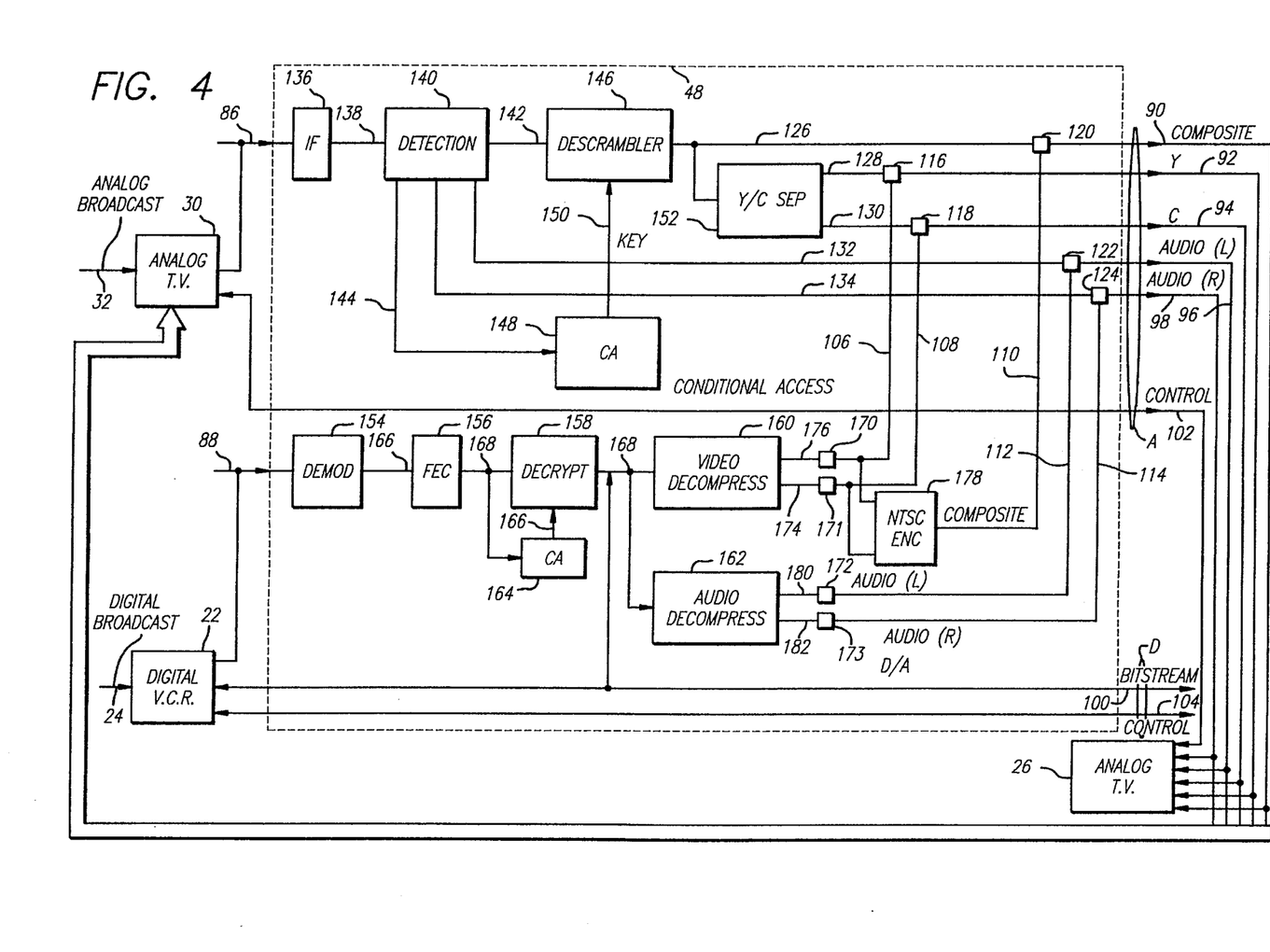
FIG. 4 illustrates a set back box utilizing the teachings of the present invention for interfacing digital and analog signals with digital and analog electronic devices.

Referring now to FIG. 4, a digital, analog-to-digital and analog set back box 48 that interfaces both digital signals and analog signals to digital video cassette recorder 22 and analog televisions 26 and 30 is illustrated. As shown, the analog television 30 receives an analog signal over a medium 32 from the medium 12 (See FIG. 1) and provides a tuned analog signal over line 86 to the digital, analog-to-digital digital and analog set back box 48. The digital video cassette recorder 22 receives a digital signal over a medium 24 from the medium 12 (See FIG. 1) and provides a tuned digital signal over line 88 to the digital, analog-to-digital and analog set back box 48. The digital, analog-to-digital and analog set back box 48 processes these digital and analog broadcast program signals received over lines 86 and 88, transforming them into a plurality of output signals provided over lines 90, 92, 94, 96, 98 and 100 ready for viewing, recording or other processing by the digital video cassette recorder 22 and the analog televisions 26 and 30. The process of transforming the signals will be described below.

The analog signals coupled over lines 90, 92, 94, 96 and 98 include an analog composite video signal on line 90, an analog luminance (Y) signal coupled to line 92, an analog chrominance (C) signal coupled to line 94, and analog left and right audio signals on lines 96 and 98. An analog control line 102 couples the digital, analog-to-digital and analog set back box 48 to the analog televisions 26 and 30. The digital signal on line 100 ready for viewing, recording or other processing contains both audio and video information. A digital control line 104 couples the digital, analog-to-digital and analog set back box 48 to the digital video cassette recorder 22. The control line signals over lines 102 and 104 allow the digital, analog-to-digital and analog set back box 48 to communicate with the digital video cassette recorder 22 and the analog televisions 26 and 30.

The signal processing of analog signals performed by the digital, analog-to-digital and analog set back box 48 is similar to that performed by the analog-to-analog set back box 46 shown in FIG. 3. The digital, analog-to-digital and analog set back box 48 also processes digital signals received over medium 24, provides digital signals over lines 100 and 104 to the digital video cassette recorder 22, and converts the digital signal received over medium 24 to analog signals on lines 106, 108, 110, 112 and 114, which are provided to a plurality of switches 116, 118, 120, 122 and 124. The switches 116, 118, 120, 122 and 124 also receive analog signals over lines 126, 128, 130, 132 and 134. The switches 116, 118, 120, 122 and 124 allow the subscriber to view analog broadcasts received over medium 32 on the analog televisions 26 or 30, or digital broadcasts received over medium 24 on the analog televisions 26 or 30, or playback signals of recorded bit streams from digital VCR on the analog televisions 26 or 30.

Turning to the processing of analog signals performed by the digital, analog-to-digital and analog set back box 48, the operation is similar to the operation of the analog-to-analog set back box 46. The analog signal from the medium 32 is received by the analog television 30. The analog television 30 tunes the signal and changes the signal's frequency from a high frequency to an intermediate frequency (IF). The tuned IF signal is provided to the set back box 48.

The tuned IF signal coupled over line 86 is processed by an IF circuit 136. The processed IF signal is provided over line 138 and is received by a detection circuit 140. The detection circuit 140 derives four signals from the main signal. The detection circuit 140 provides a possibly scrambled video composite portion of the broadcast signal over line 142. The detection circuit 140 also provides left and right audio portions of the signal over lines 132 and 134, as well as a portion of the broadcast signal that carries the security code for the broadcast over a line 144.

The video composite portion of the signal provided over line 142 is coupled to a descrambler 146. The portion of the signal carrying the security code for the broadcast provided over line 144 is coupled to a conditional access (CA) circuit 148. If the subscriber is entitled to view the broadcast, the conditional access circuit 148 transmits a control signal over line 150 to the signal descrambler 146, which provides the descrambler 146 with the key to descramble the composite video portion of the broadcast signal.

The descrambled signal is coupled to a line 126 which is coupled to a switch 120. A luminance/chrominance separation circuit 152 coupled to the descrambler 146 splits the descrambled signal into its constituent parts: a luminance (Y) signal provided on line 128 and a chrominance (C) signal on line 130. These (Y) and (C) signals are provided to the switches 116 and 118.

The left and right audio portions of the signals coupled to lines 132 and 134 which are derived from the main broadcast signal are provided to the switches 122 and 124.

The analog televisions 26 and 30 are also coupled to the set back box 48 by an analog control line 102, over which a command signal passes. More specifically, the control line 102 allows a subscriber to issue commands to the set back box 48 and provides the analog televisions 26 and 30 with pertinent information.

To interface digital signals with digital devices, the digital, analog-to-digital and analog back box 48 contains a demodulator 154, a forward error correction circuit (FEC) 156, a decryption device 158 and a conditional access (CA) circuit 164. Broadcast signals coupled over medium 24 are provided to digital video cassette recorder 22, which tunes the digital signal and provides the tuned signal to the digital, analog-to-digital and analog set back box 48 over line 88. The demodulator 154 receives the tuned signal and transforms it into a bit stream coupled over line 166. The bit stream on line 166 is provided to the FEC 156 to check for and correct any errors in the transmission of the digital data. The corrected bit stream coupled over line 168 is provided to the decryption device 158 and the conditional access circuit 164. The conditional access circuit 164 checks if the subscriber is entitled to view the particular broadcast, and, if so, provides a key coupled over line 166 to the decryption device 158 to allow it to regenerate the original data. The regenerated digital bit stream over line 100 is provided to the digital video cassette recorder 22.

A digital control line 104 allows a subscriber to issue commands to the set back box 48 and provides information to the digital video cassette recorder 22.

To provide for a digital signal interface with analog consumer electronics devices, the digital, analog-to-digital and analog set back box 48 contains video and audio decompressors 160 and 162 and a plurality of digital to analog converters 170, 171, 172, and 173. The video and audio decompressors 160 and 162 are coupled to the decryption device 158. It will be noted that the decompressors are not placed in the digital to digital interface because it is assumed that the digital consumer electronics device is configured to accept compressed data. If, however, the digital electronic device is not configured to accept compressed data, the digital signal should be decompressed before it is provided to the digital device.

The decompressed video bit stream is split into two parts: a luminance (Y) signal coupled over line 176, and chrominance (C) signal coupled over line 174. These two different bit streams provided over lines 174 and 176 are then converted by digital to analog converters 170 and 171 into analog signals coupled over lines 106 and 108. As illustrated by FIG. 4, the analog Y and C signals provided over lines 106 and 108 are then provided to switches 116 and 118. As previously described, these switches 116 and 118 also receive the Y and C signals provided over lines 128 and 130 derived from the original analog signal over line 142. The position of the switches 116 and 118 determines whether the Y or C signal that was originally analog or originally digital is provided to the analog televisions 26 and 30.

In addition, the Y and C signals that were converted from digital data over lines 106 and 108 are provided to an NTSC encoder 178, which produces a composite signal on line 110 from the constituent Y and C signals provided over lines 106 and 108. This composite signal over line 110 is provided to a switch 120. As previously described, this switch 120 also receives the original analog composite signal coupled over line 126. The position of the switch 120 determines whether the original analog or digital composite signal is provided to the analog televisions 26 and 30.

The audio decompressor 162 decompresses the audio portion of the broadcast signal into a left channel provided over line 180 and a right channel over line 182. The decompressed left and right channel digital audio signals on lines 180 and 182 are provided to digital to analog converters 172 and 173, as shown. The audio signals on lines 112 and 114 are provided to a plurality of switches 122 and 124. As previously described, these switches 122 and 124 also receive original analog left and right audio signals over lines 132 and 134. The position of the switches 122 and 124 determines whether the original digital or original analog audio signal is provided to the analog televisions 26 and 30.

Thus, in addition to an analog to analog interface, the digital, analog-to-digital and analog set back box 48 provides an interface between digital signals and the digital video cassette recorder 22 and the analog televisions 26 and 30. System security is maintained, since the set back box 48 descrambles only those signals which the subscriber is entitled to. The ability to use advanced features is also maintained, because the set back box 48 provides unscrambled and decrypted signals, if the subscriber is entitled to the signals, to the consumer electronics devices.

Digital-to-Digital and Analog Set Back Box

Figure 5:
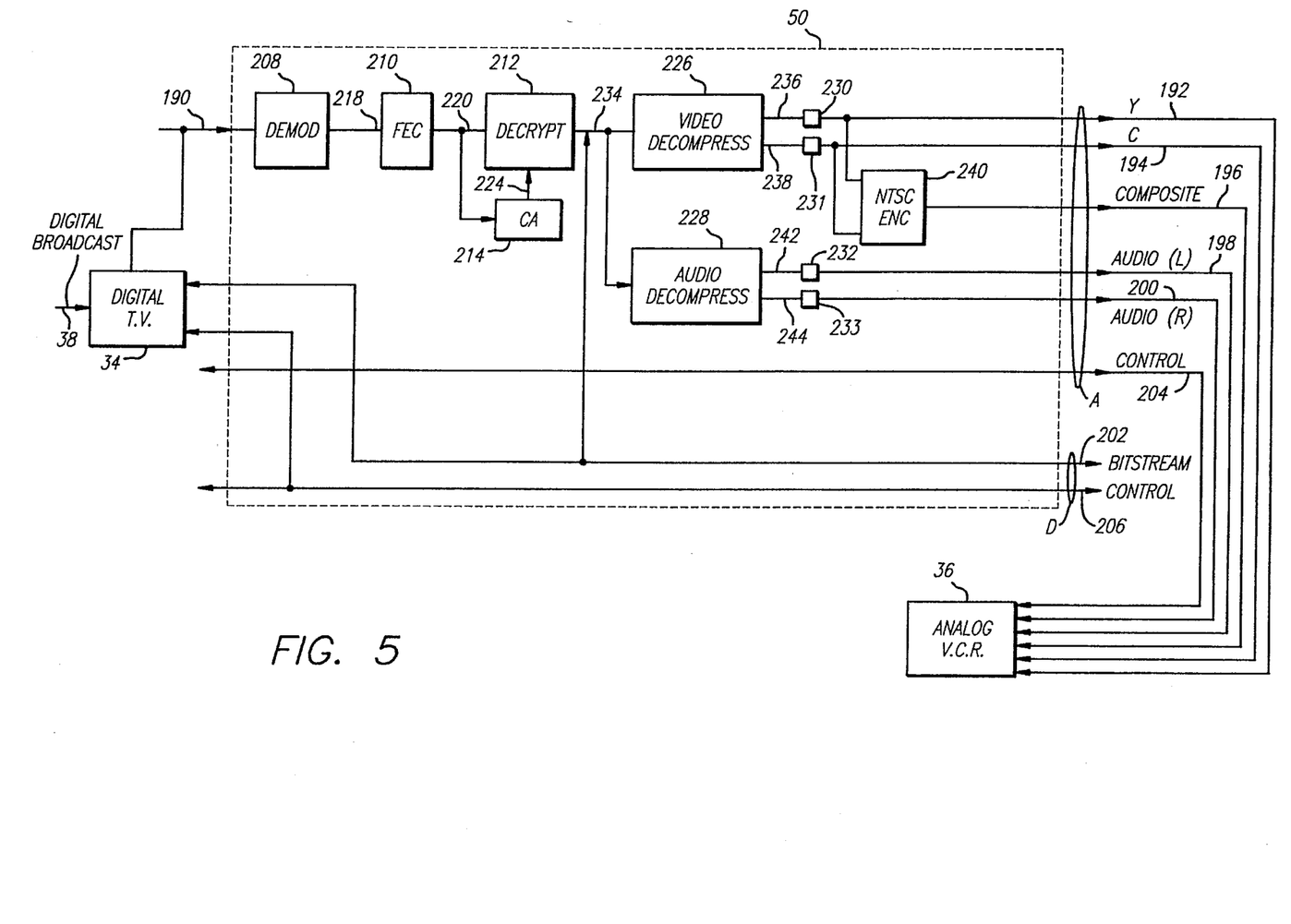
FIG. 5 illustrates a set back box utilizing the teachings of the present invention for interfacing digital signals with digital and analog electronic devices.

Referring now to FIG. 5, a digital-to-digital and analog set back box 50 that interfaces digital signals received over a medium 38 from the medium 12 (See FIG. 1), with the digital television 34 and the analog video cassette recorder 36 is illustrated. As shown, the digital television 34 receives the digital broadcast signal over medium 38 and provides a tuned digital signal over line 190 to the digital-to-digital and analog set back box 50. The digital-to-digital and analog set back box 50 processes this digital broadcast program signal over line 190, transforming it into a plurality of signals coupled on lines 192, 194, 196, 198, 200 and 202 ready for viewing, recording or other processing by the digital television 34 and the analog video cassette recorder 36. The process of transforming the signal will be described below. The analog signals travelling over lines 192, 194, 196, 198 and 200 ready for viewing, recording or other processing provided by the digital-to-digital and analog set back box 50 to the analog video cassette recorder 36 include an analog composite video signal coupled over line 196, an analog luminance (Y) video signal on line 192, an analog chrominance (C) video signal on line 194, and analog left and right audio signals on lines 198 and 200.

An analog control line 204 couples the set back box 50 with the analog video cassette recorder 36. The digital signal provided by the digital-to-digital and analog set back box 50 to the digital television 34 is a digital audio and video signal over line 202. A digital control line 206 couples the set back box 50 with the digital television 34. The control signals on lines 204 and 206 allow the set back box 50 to communicate with the digital television 34 and the analog video cassette recorder 36.

As illustrated in FIG. 5, to interface digital signals with digital devices, the digital-to-digital and analog set back box 50 contains a demodulator 208, a forward error correction circuit (FEC) 210, a decryption device 212 and a conditional access circuit 214. The digital broadcast signal received over line 190 is provided to the demodulator 208 to transform the digital signal into a bit stream over line 218. The bit stream on line 218 is provided to the FEC 210 to check for and correct any errors in the transmission. The corrected bit stream coupled to line 220 is provided to the decryption device 212 and the conditional access (CA) circuit 214. The conditional access circuit 214 checks if the subscriber is entitled to view the particular broadcast, and, if so, provides a key signal over line 224 to the decryption device 212, to allow the decryption device 212 to regenerate the original data. The regenerated digital bit stream is provided over line 202 to the digital television 34.

A digital control line 206 allows a subscriber to issue commands to the digital-to-digital and analog set back box and provides information to the digital television 34.

As illustrated in FIG. 5, to provide for a digital signal interface with the analog video cassette recorder 36, the digital-to-digital and analog set back box 50 contains video and audio decompressors 226 and 228 and a plurality of digital to analog converters 230, 231, 232 and 233. The digital signal on line 234 is provided to the video and audio decompressors 226 and 228.

The decompressed video bit stream is split into two constituent parts: luminance (Y) coupled over line 236 and chrominance (C) provided over line 238. These two bit streams on lines 236 and 238 are then converted by digital to analog converters 230 and 231 into analog signals on lines 192 and 194; as illustrated by FIG. 5, the analog Y and C signals on lines 192 and 194 are then provided to the analog video cassette recorder 36.

In addition, the Y and C signals are provided to an NTSC encoder 240, which produces a composite signal on line 196 from the constituent Y and C signals on lines 192 and 194. This composite signal on line 196 is provided to the analog video cassette recorder 36.

The audio decompressor 228 decompresses the audio portion of the signal into a left channel on line 242 and a right channel on line 244. The decompressed left and right channel digital signals on lines 242 and 244 are provided to a plurality of digital to analog converters 232 and 233 coupled to lines 198 and 200. The audio signals on lines 198 and 200 are provided to the analog video cassette recorder 36.

Thus, the digital-to-digital and analog set back box 50 provides a plurality of digital and analog electronic devices with digital and analog signals ready for viewing, recording or other processing by the electronic devices. System security is maintained, since the set back box decrypts only those signals which the subscriber is entitled to view. The ability to use advanced features is also maintained, because the set back box provides decrypted or descrambled signals, if the subscriber is entitled to view the signals, to the consumer electronics devices.

Digital-to-Digital Set Back Box

Figure 6:
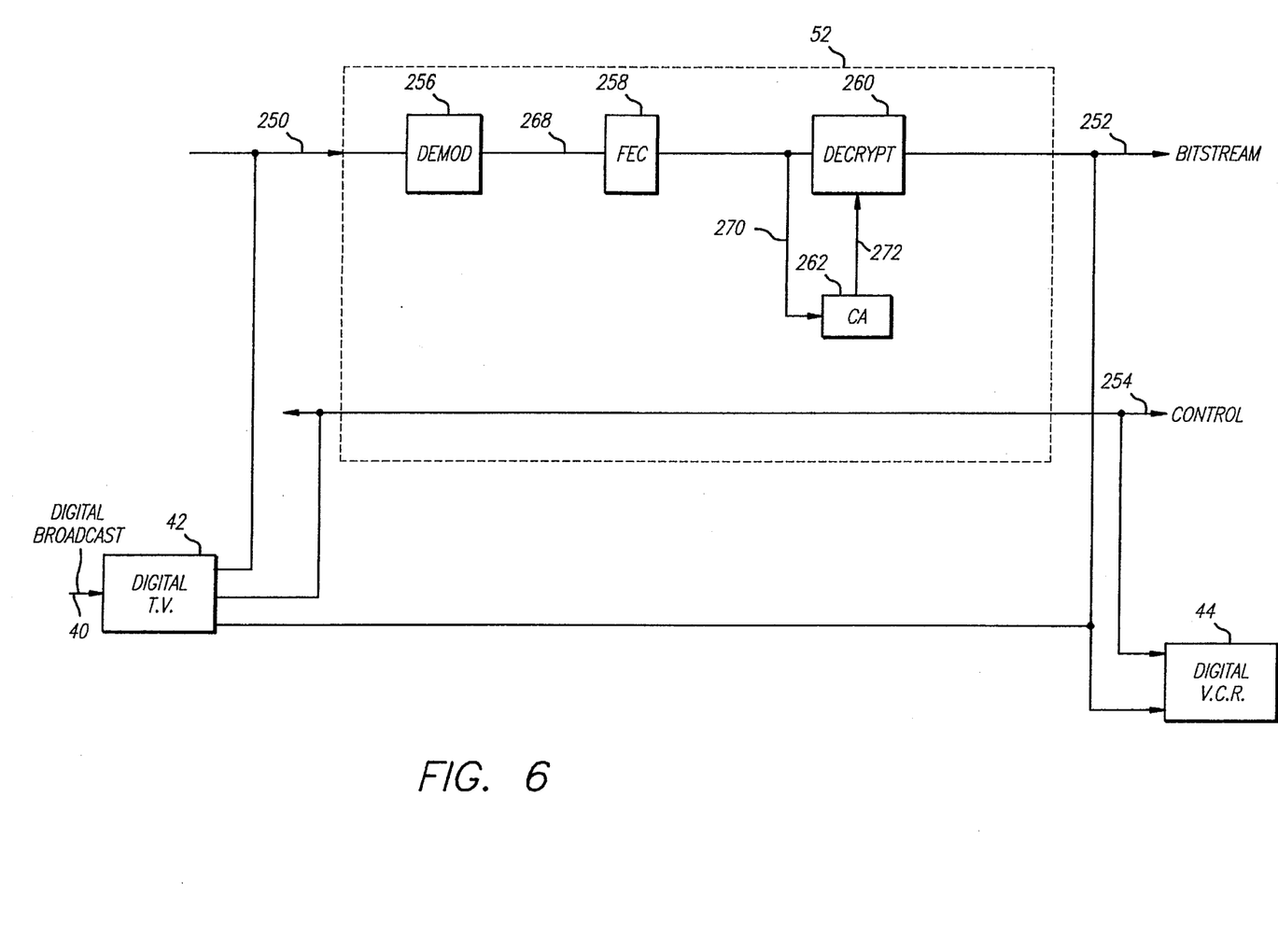
FIG. 6 illustrates a set back box utilizing the teachings of the present invention for interfacing digital signals with digital electronic devices.

Referring now to FIG. 6, a digital-to-digital set back box 52 that interfaces a digital signal received over a medium 40 with the digital television 49 and the digital video cassette recorder 44 is illustrated. As shown, the digital television 49 receives a digital signal through medium 40 from the medium 12 (see FIG. 1) and provides a tuned digital signal over line 250 to the digital-to-digital set back box 52. The set back box 52 processes this tuned digital broadcast program signal received over line 250, transforming it into a signal over line 252 ready for viewing, recording or other processing by the digital television 42 and the digital video cassette recorder 44. The process of transforming the signal will be described below. A digital control line 254 couples the set back box 52 with the digital television 42 and the digital video cassette recorder 44. The control line 254 allows the digital-to-digital set back box 52 to communicate with the digital television 42 and the digital video cassette recorder 44.

As illustrated in FIG. 6, to interface digital signals with digital devices, the digital-to-digital set back box 52 contains a demodulator 256, a forward error correction circuit (FEC) 258, a decryption device 260 and a conditional access circuit 262. The digital broadcast received over line 250 is provided to the demodulator 256 to transform the digital signal on line 250 into a bit stream on line 268. The bit stream on line 268 is provided to the FEC 258 to check for and correct any errors in the transmission of the digital data. The corrected bit stream on line 270 is provided to the decryption device 260 and the conditional access circuit 262. The conditional access circuit 262 checks if the subscriber is entitled to view the particular channel, and, if so, provides a key signal over line 272 to the decryption device 260 to allow the decryption device 260 to regenerate the original data. This digital bit stream 252 is provided to the digital television 42 and the digital video cassette recorder 44.

A digital control line 254 allows a subscriber to issue commands to the digital-to-digital set back box 52 and provides information to the digital television 42 and the digital video cassette recorder 44.

Thus, the digital-to-digital set back box 52 of the present invention provides digital electronic devices with digital signals ready for viewing, recording or other processing. System security is maintained, since the set back boxes decrypt only those signals which the subscriber is entitled to. The ability to use advanced features is also maintained, because the set back box provides decrypted signals, if the subscriber is entitled to view the signals, to the consumer electronics devices.

High Definition Television Set Back Box

In a cable based home entertainment system, digital high definition (HDTV) signals may be interfaced with analog electronic devices, digital electronic devices or both analog and digital electronic devices. To interface HDTV signals with only digital electronic devices, the digital-to-digital set back box 52 is employed. To interface HDTV signals with analog and digital electronic devices, a high definition television set back box 53 as shown in FIG. 7 is employed.

Figure 7:
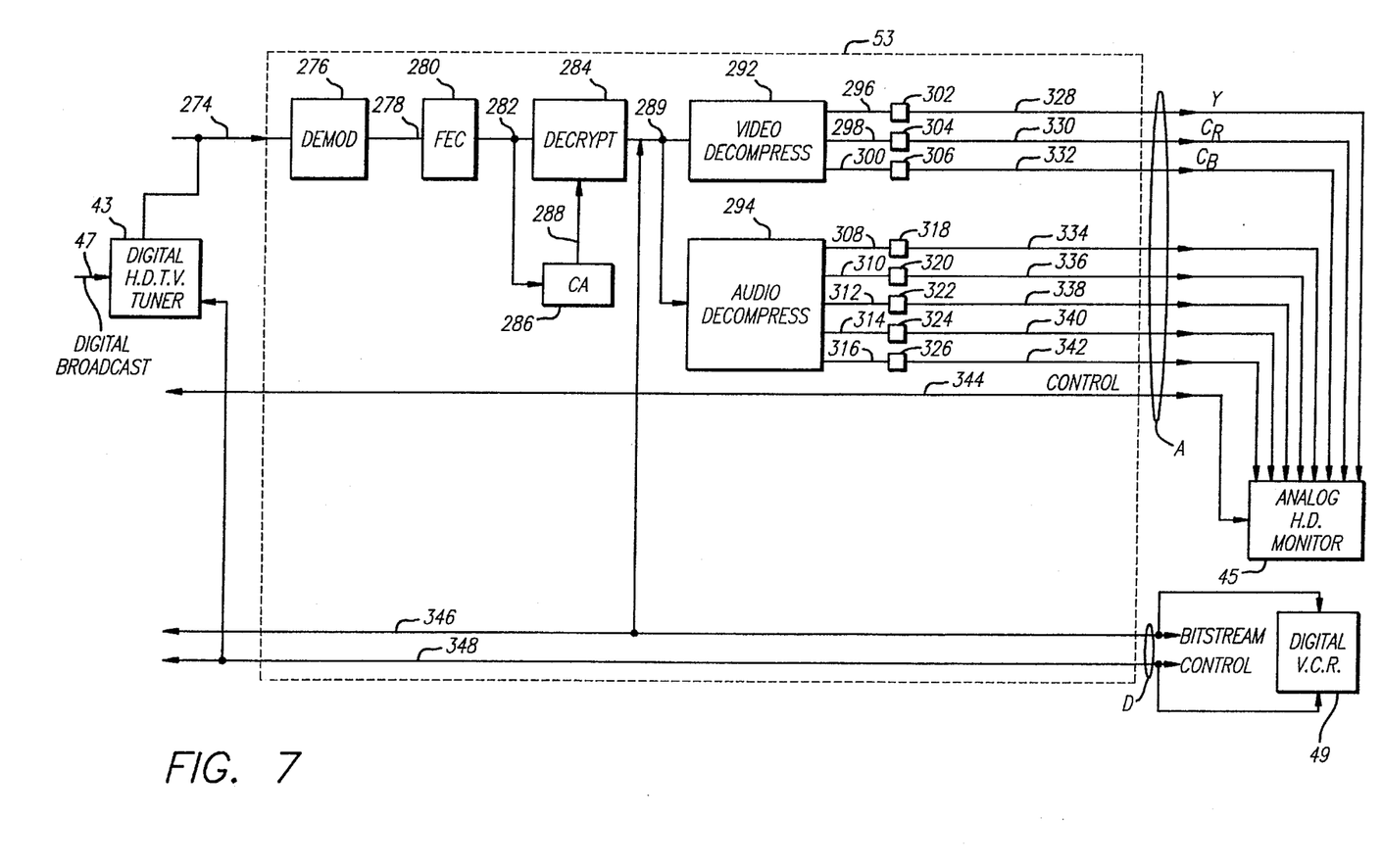
FIG. 7 illustrates a set back box utilizing the teachings of the present invention for interfacing digital high definition television (HDTV) signals with digital and analog electronic devices.

As illustrated in FIG. 7, the high definition television set back box 53 interfaces HDTV signals received over a medium 47 from the medium 12 (See FIG. 1) with the digital HDTV tuner 43, the analog high definition monitor 45 and the digital video cassette recorder 49. It will be appreciated that the high definition television set back box 53 may interface other digital electronic devices, such as digital VCR, with HDTV signals. As shown in FIG. 7, the digital HDTV tuner 43 receives the digital broadcast signal over medium 47 and provides a tuned digital signal over line 274 to the high definition television set back box 53. The high definition television set back box 53 processes this digital HDTV broadcast program signal over line 274, transforming it into a plurality of signals coupled on lines 328, 330, 332, 334, 336, 338, 340, 342 and 346 ready for viewing, recording or other processing by the digital video cassette recorder 49 and the analog high definition monitor 45. The process of transforming the digital HDTV signal will be described below. The analog signals travelling over lines 328, 330, 332, 334, 336, 338, 340 and 342 ready for viewing, recording or other processing provided by the high definition television set back box 53 to the analog high definition monitor 45 include an analog luminance (Y) video signal on line 328, an analog chrominance difference ($C_r$) video signal on line 330, an analog chrominance difference signal ($C_b$) on line 332, and analog audio signals on lines 334, 336, 338, 340 and 342.

An analog control line 344 couples the high definition television set back box 53 with the analog high definition monitor 45. The digital signal provided by the high definition television set back box 53 to the digital HDTV tuner 43 is an audio and video compressed bit stream over line 346. A digital control line 348 couples the high definition television set back box 53 with the digital HDTV tuner 43 and the digital videocassette recorder 49. The control signals on lines 344 and 348 allow the high definition television set back box 53 to communicate with the digital HDTV tuner 43, the digital video cassette recorder 49 and the high definition monitor 45.

As illustrated in FIG. 7, to interface digital high definition television signals with digital devices, the high definition television set back box 53 contains a demodulator 276, a forward error correction circuit (FEC) 280, a decryption device 284 and a conditional access circuit 286. The digital broadcast signal received over line 274 is provided to the demodulator 276 to transform the digital signal into a bit stream over line 278. The bit stream on line 278 is provided to the FEC 280 to check for and correct any errors in the transmission. The corrected bit stream coupled to line 282 is provided to the decryption device 284 and the conditional access (CA) circuit 286. The conditional access circuit 286 checks if the subscriber is entitled to view the particular broadcast, and, if so, provides a key signal over line 288 to the decryption device 284, to allow the decryption device 284 to regenerate the original data. The regenerated digital bit stream is provided over line 346 to the digital video cassette recorder 49.

A digital control line 348 allows a subscriber to issue commands to the set back box 53 and provides information to the digital HDTV tuner 43 and digital video cassette recorder 49.

As illustrated in FIG. 7, to provide for a digital high definition television signal interface with the analog high definition monitor 45, the high definition television set back box 53 contains video and audio decompressors 292 and 294 and a plurality of digital to analog converters 302, 304, 306, 318, 320, 322, 324 and 326. The digital signal on line 289 is provided to the video and audio decompressors 292 and 294.

The decompressed video bit stream is split into three signals: luminance (Y) coupled over line 296, chrominance differences ($C_r$) over line 298, and chrominance difference ($C_b$) over line 300. These three bit streams on lines 296, 298 and 300 are then converted by digital to analog converters 302, 304 and 306 into analog signals on lines 328, 330 and 332; as illustrated by FIG. 7, the analog Y, $C_r$ and $C_b$ signals on lines 328, 330 and 332 are then provided to the high analog definition monitor 45.

The audio decompressor 294 decompresses the audio portion of the signal into five audio signals on lines 308, 310, 312, 314 and 316. The decompressed audio digital signals on lines 308, 310, 312, 314 and 316 are provided to the digital to analog converters 318, 320, 322, 324 and 326 coupled to lines 334, 336, 338, 340 and 342. The analog audio signals on lines 334, 336, 338, 340 and 342 are provided to the high definition monitor 45.

Thus, the high definition television set back box 53 provides electronic devices with an HDTV signal ready for viewing, recording or other processing by the electronic devices. System security is maintained, since the set back box decrypts only those signals which the subscriber is entitled to view. The ability to use advanced features is also maintained, because the set back box provides decrypted or descrambled signals, if the subscriber is entitled to view the signals, to the consumer electronics devices.

Summary

As will be appreciated, the set back boxes comprising the present invention allow for any number of digital and analog televisions or VCRS (or any other device, such as a digital computer, configured to receive broadcasts) to be integrated into one system, whether the system receives a digital signal, an analog signal, or both types of signals. In addition, the set back boxes and electronic devices of the present invention may communicate through cable lines, light and sound signals, fiber optics or other means for communication.

Although, the invention has been described in conjunction with the preferred embodiments, numerous alternatives, modifications, variations and uses will be apparent to those skilled in the art in light of the foregoing description. For example, instead of analog left and right audio outputs, a system might have Dolby® Surround sound audio outputs. Further, a device such as a stereo may receive only the audio outputs while other devices may receive only the video outputs. Other circuits further manipulating the signals may also be added, and the digital signal may be split into audio and video portions, and the audio portions output to a digital stereo system. In the digital, analog-to-digital and analog or the digital-to-digital and analog set back boxes, the video signal may be decompressed as a composite video signal, without separation into the luminance (Y) and chrominance (C) parts. The video signal may be filtered or otherwise modified for a particular electronic device. Also, the ordering of the elements may be changed, and the signal could be descrambled before it is split into separate audio and video components. Luminance and chrominance may also be separated before the video signal is descrambled. In addition, digital and analog control lines may be interfaced to allow for communication between digital and analog electronic devices.

We claim:

1. An apparatus for interfacing broadcast signals from a signal source with at least one electronic device, comprising:

broadcast signal receiving means coupled to said electronic device for receiving an analog broadcast signal;

intermediate frequency generation means coupled to said broadcast signal receiving means for converting said received analog broadcast signal into an intermediate frequency (IF) signal;

signal generation means coupled to receive said IF signal for generating from said IF signal a plurality of analog audio and video signals, including separate luminance and chrominance signals, and providing said plurality of audio and video signals to said electronic device; and control line means for providing control signals from said electronic device to said signal generation means and for providing control signals from said signal generation means to said electronic device.

2. An apparatus for interfacing broadcast signals from a signal source with at least one electronic device, comprising:

broadcast signal receiving means coupled to said electronic device for receiving an analog broadcast signal;

intermediate frequency generation means coupled to said broadcast signal receiving means for converting said received analog broadcast signal into an intermediate frequency (IF) signal;

signal generation means coupled to receive said IF signal for generating from said IF signal a plurality of analog audio and video signals, including separate luminance and chrominance signals, and providing said plurality of audio and video signals to said electronic device; and wherein said signal generation means further includes detection means coupled to receive said IF signal for separating said IF signal into separate audio, composite video and security signals.

3. The apparatus of claim 2 wherein said signal generation means further includes descrambler means coupled to receive said composite video signal for descrambling said composite video signal when a subscriber is authorized to view said broadcast signal.

4. The apparatus of claim 3 wherein said signal generation means further includes conditional access signal generation means coupled to receive said security signal for providing said descrambler with a conditional access signal when said subscriber is authorized to view said broadcast signal so that said descrambler means descrambles said composite video signal only when said descrambler means receives said conditional access signal.

5. The apparatus of claim 4 wherein said signal generation means further includes luminance/chrominance separation means coupled to receive said composite video signal for separating said composite video signal into separate luminance and chrominance signals.

6. An apparatus for interfacing broadcast signals from a signal source with at least one electronic device, comprising:

broadcast signal receiving means coupled to said electronic device for receiving analog and digital broadcast signals;

intermediate frequency generation means coupled to said broadcast receiving means for converting said received analog broadcast signal into an intermediate frequency (IF) signal;

tuned digital signal generation means coupled to said broadcast receiving means for tuning said received digital broadcast signal;

signal generation means coupled to receive said IF signal and further coupled to receive said tuned digital signal for generating from said IF signal and said tuned digital signal a plurality of analog audio and video signals, including separate luminance and chrominance signals, and a digital audio and video signal, and providing said plurality of audio and video signals and said digital audio and video signal to said electronic device.

7. The apparatus of claim 6 further including control line means for providing control signals from said electronic device to said signal generation means and for providing control signals from said signal generation means to said electronic device.

8. The apparatus of claim 6 wherein said signal generation means further includes detection means coupled to receive said IF signal for separating said IF signal into separate first analog audio, first analog composite video and security signals.

9. The apparatus of claim 8 wherein said signal generation means further includes descrambler means coupled to receive said first analog composite video signal for descrambling said first analog composite video signal when a subscriber is authorized to view said analog broadcast signal.

10. The apparatus of claim 9 wherein said signal generation means further includes analog conditional access signal generating means coupled to receive said security signal for providing said descrambler means with an analog conditional access signal when said subscriber is authorized to view said analog broadcast signal, such that said descrambler means descrambles said first analog composite video signal only when said descrambler means receives said analog conditional access signal.

11. The apparatus of claim 10 wherein said signal generation means further includes luminance/chrominance separation means coupled to receive said first composite video signal for separating said first composite video signal into separate first analog luminance and first analog chrominance signals.

12. The apparatus of claim 11 wherein said signal generation means further includes demodulator means coupled to receive said tuned digital signal for converting said digital signal into a bit stream.

13. The apparatus of claim 12 wherein said signal generation means further includes forward error correction means coupled to receive said bit stream for correcting transmission errors in said bit stream.

14. The apparatus of claim 13 wherein said signal generation means further includes decryption means coupled to receive said corrected bit stream for decrypting said corrected bit stream if said subscriber is authorized to view said digital broadcast signal.

15. The apparatus of claim 14 wherein said signal generation means further includes digital conditional access signal generating means coupled to receive said corrected bit stream for providing said decryption means with a digital conditional access signal when the subscriber is authorized to view said digital broadcast signal so that said decryption means decrypts said corrected bit stream only when said decryption means receives said digital conditional access signal.

16. The apparatus of claim 15 wherein said signal generation means further includes:

video decompression means coupled to receive said decrypted bit stream for decompressing said decrypted bit stream into separate decompressed digital luminance and chrominance signals;

first digital to analog conversion means coupled to receive said decompressed digital luminance signal for converting said decompressed digital luminance signal into a second analog luminance signal;

second digital to analog conversion means coupled to receive said decompressed digital chrominance signal for converting said decompressed digital chrominance signal into a second analog chrominance signal.

17. The apparatus of claim 16 wherein said signal generation means further includes NTSC encoder means coupled to receive said second analog luminance and chrominance signals for converting said second analog luminance and chrominance signals into a second analog composite video signal.

18. The apparatus of claim 17 wherein said signal generation means further includes:

audio decompression means coupled to receive said decrypted bit stream for decompressing said decrypted bit stream into at least one decompressed digital audio signal;

third digital to analog conversion means coupled to receive said at least one decompressed digital audio signal for converting said at least one decompressed digital audio signal into one or more second analog audio signals.

19. The apparatus of claim 18 wherein said signal generation means further includes:

composite video switching means coupled to receive said first analog composite video signal and further coupled to receive said second analog composite video signal for selectively switching between said first analog composite video signal and said second analog composite video signal, and providing said electronic device with either said first analog composite video signal or said second analog composite video signal;

luminance signal switching means coupled to receive said first analog luminance signal and further coupled to receive said second analog luminance signal for selectively switching between said first analog luminance signal and said second analog luminance signal and providing said electronic device with either said first analog luminance signal or said second analog luminance signal;

chrominance signal switching means coupled to receive said first analog chrominance signal and further coupled to receive said second analog chrominance signal for selectively switching between said first analog chrominance signal and said second analog chrominance signal and providing said electronic device with either said first analog chrominance signal or said second analog chrominance signal;

audio signal switching means coupled to receive said first analog audio signal and further coupled to receive said second analog audio signal for selectively switching between said first analog audio signal and said second analog audio signal and providing said electronic device with either said first analog audio signal or said second analog audio signal.

20. An apparatus for interfacing digital high definition television broadcast signals from a signal source with at least one electronic device, comprising:

broadcast signal receiving means coupled to said electronic device for receiving a digital high definition television broadcast signal;

tuned high definition signal generation means coupled to said broadcast receiving means for tuning said received digital high definition television broadcast signal;

analog signal generating means coupled to receive said tuned high definition signal for generating from said tuned high definition signal separate analog luminance, red chrominance difference, and blue chrominance difference signals and at least two analog audio signals.

21. An apparatus for interfacing broadcast signals from a signal source with at least one electronic device, comprising:

broadcast signal receiving means coupled to said electronic device for receiving a digital broadcast signal;

tuned digital signal generation means coupled to said broadcast receiving means for tuning said received digital broadcast signal;

signal generation means coupled to receive said tuned digital signal for generating a digital video and audio signal from said tuned digital signal and providing said digital video and audio signal to said electronic device; and control line means for providing control signals from said electronic device to said signal generation means and for providing control signals from said signal generation means to said electronic device.

22. An apparatus for interfacing broadcast signals from a signal source With at least one electronic device, comprising:

broadcast signal receiving means coupled to said electronic device for receiving a digital broadcast signal;

tuned digital signal generation means coupled to said broadcast receiving means for tuning said received digital broadcast signal;

signal generation means coupled to receive said tuned digital signal for generating a digital video and audio signal from said tuned digital signal and providing said digital video and audio signal to said electronic device; and wherein said signal generation means further includes demodulator means coupled to receive said tuned digital signal for converting said digital signal into a bit stream.

23. The apparatus of claim 22 wherein said signal generation means further includes forward error correction means coupled to receive said bit stream for correcting transmission errors in said bit stream.

24. The apparatus of claim 23 wherein said signal generation means further includes decryption means coupled to receive said corrected bit stream for decrypting said corrected bit stream when a subscriber is authorized to view said digital broadcast signal.

25. The apparatus of claim 24 wherein said signal generation means further includes digital conditional access signal generating means coupled to receive said corrected bit stream for providing said decryption means with a digital conditional access signal when said subscriber is authorized to view said digital broadcast signal so that said decryption means decrypts said corrected bit stream only when said decryption means receives said conditional access signal.

26. The apparatus of claim 25 wherein said signal generation means further includes analog signal generating means for generating from said tuned digital signal a plurality of analog audio and video signals, including separate luminance and chrominance signals, and providing said plurality of analog audio and video signals to said electronic device.

27. The apparatus of claim 26 wherein said digital broadcast signal comprises a high definition television broadcast signal and wherein said analog signal generating means further includes means for generating from said tuned digital signal separate analog luminance, red chrominance difference, and blue chrominance difference signals and at least two analog audio signals.

28. The apparatus of claim 26 wherein said signal generation means further includes:

video decompression means coupled to receive said decrypted bit stream for decompressing said decrypted bit stream into separate decompressed digital luminance and chrominance signals;

first digital to analog conversion means coupled to receive said decompressed digital luminance signal for converting said decompressed digital luminance signal into an analog luminance signal;

second digital to analog conversion means coupled to receive said decompressed digital chrominance signal for converting said decompressed digital chrominance signal into an analog chrominance signal.

29. The apparatus of claim 28 wherein said signal generation means further includes:

audio decompression means coupled to receive said decrypted bit stream for decompressing said decrypted bit stream into at least one decompressed audio signal;

third digital to analog conversion means coupled to receive said at least one decompressed audio signal for converting said at least one decompressed digital audio signal into one or more analog audio signals.

30. A method for interfacing broadcast signals from a signal source with at least one electronic device, comprising the steps of:

receiving an analog broadcast signal;

converting said received analog broadcast signal into an intermediate frequency (IF) signal;

generating from said IF signal a plurality of analog audio and video signals, including separate luminance and chrominance signals, and providing said plurality of audio and video signals to said electronic device; and providing control signals from said electronic device to a signal generation device that generates from said IF signal said plurality of analog audio and video signals and providing control signals from said signal generation device to said electronic device.

31. A method for interfacing broadcast signals from a signal source with at least one electronic device, comprising the steps of:

receiving an analog broadcast signal;

converting said received analog broadcast signal into an intermediate frequency (IF) signal;

generating from said IF signal a plurality of analog audio and video signals, including separate luminance and chrominance signals and providing said plurality of audio and video signals to said electronic device; and wherein said step of generating a plurality of audio and video signals further includes the step of separating said IF signal into separate audio, composite video and security signals.

32. The method of claim 31 wherein said step of generating a plurality of audio and video signals further includes the step of descrambling said composite video signal when a subscriber is authorized to view said broadcast signal.

33. The method of claim 32 wherein said step of generating a plurality of audio and video signals further includes the step of generating a conditional access signal such that said composite video signal is descrambled only when said conditional access signal is generated.

34. The method of claim 33 further comprising the steps of:

receiving a digital broadcast signal from said signal source;

tuning said received digital broadcast signal;

generating from said tuned digital signal a plurality of analog audio and video signals, including separate luminance and chrominance signals, and a digital video and audio signal and providing said plurality of audio and video signals and said digital audio and video signal to said electronic device.

35. The method of claim 34 wherein said step of generating a plurality of audio and video signals and a digital video and audio signal further includes the step of separating said IF signal into separate first analog audio, first analog composite video and security signals.

36. The method of claim 35 wherein said step of generating a plurality of audio and video signals and a digital video and audio signal further includes the step of separating said first composite video signal into separate first analog luminance and first analog chrominance signals.

37. The method of claim 36 wherein said step of generating a plurality of audio and video signals and a digital video and audio signal further includes the step of converting said digital signal into a bit stream.

38. The method of claim 37 wherein said step of generating a plurality of audio and video signals and a digital video and audio signal further includes the step of decrypting said bit stream when a subscriber is authorized to view said digital broadcast signal.

39. The method of claim 38 wherein said step of generating a plurality of audio and video signals and a digital video and audio signal further includes the steps of:

decompressing said decrypted bit stream into separate decompressed digital luminance and chrominance signals;

converting said decompressed digital luminance signal into a second analog luminance signal;

converting said decompressed digital chrominance signal into a second analog chrominance signal.

40. The method of claim 39 wherein said step of generating a plurality of audio and video signals and a digital video and audio signal further includes the steps of converting said second analog luminance and chrominance signals into a second analog composite video signal.

41. The method of claim 40 wherein said step of generating a plurality of audio and video signals and a digital video and audio signal further includes the steps of:

decompressing said decrypted bit stream into at least one decompressed digital audio signal;

converting said at least one decompressed digital audio signal into one or more second analog audio signals.

42. The method of claim 41 wherein said step of generating a plurality of audio and video signals and a digital video and audio signal further includes the steps of:

selectively switching between said first analog composite video signal and said second analog composite video signal and providing said electronic device with either said first analog composite video signal or said second analog composite video signal;

selectively switching between said first analog luminance signal and said second analog luminance signal and providing said electronic device with either said first analog luminance signal or said second analog luminance signal;

selectively switching between said first analog chrominance signal and said second analog chrominance signal and providing said electronic device with either said first analog chrominance signal or said second analog chrominance signal;

selectively switching between said first analog audio signal and said second analog audio signal and providing said electronic device with either said first analog audio signal or said second analog audio signal.

43. A method for interfacing broadcast signals from a signal source with at least one electronic device, comprising the steps of:

receiving a digital broadcast signal;

tuning said received digital broadcast signal;

generating a digital video and audio signal from said tuned broadcast signal and providing said digital video and audio signal to said electronic device; and providing control signals from said electronic device to a signal generation device that generates from said IF signal said plurality of analog audio and video signals and providing control signals from said signal generation device to said electronic device.

44. The method of claim 43 further comprising the step of generating from said tuned digital signal a plurality of analog audio and video signals, including separate luminance and chrominance signals and providing said plurality of analog audio and video signals to said electronic device.

45. The method of claim 44, wherein said digital broadcast signal comprises a high definition television broadcast signal and wherein said step of generating from said tuned digital signal a plurality of analog audio and video signals further comprises the steps of generating separate analog luminance, red chrominance difference and blue chrominance difference signals and at least two analog audio signals.

* * * * *